Patented Apr. 14, 1925.

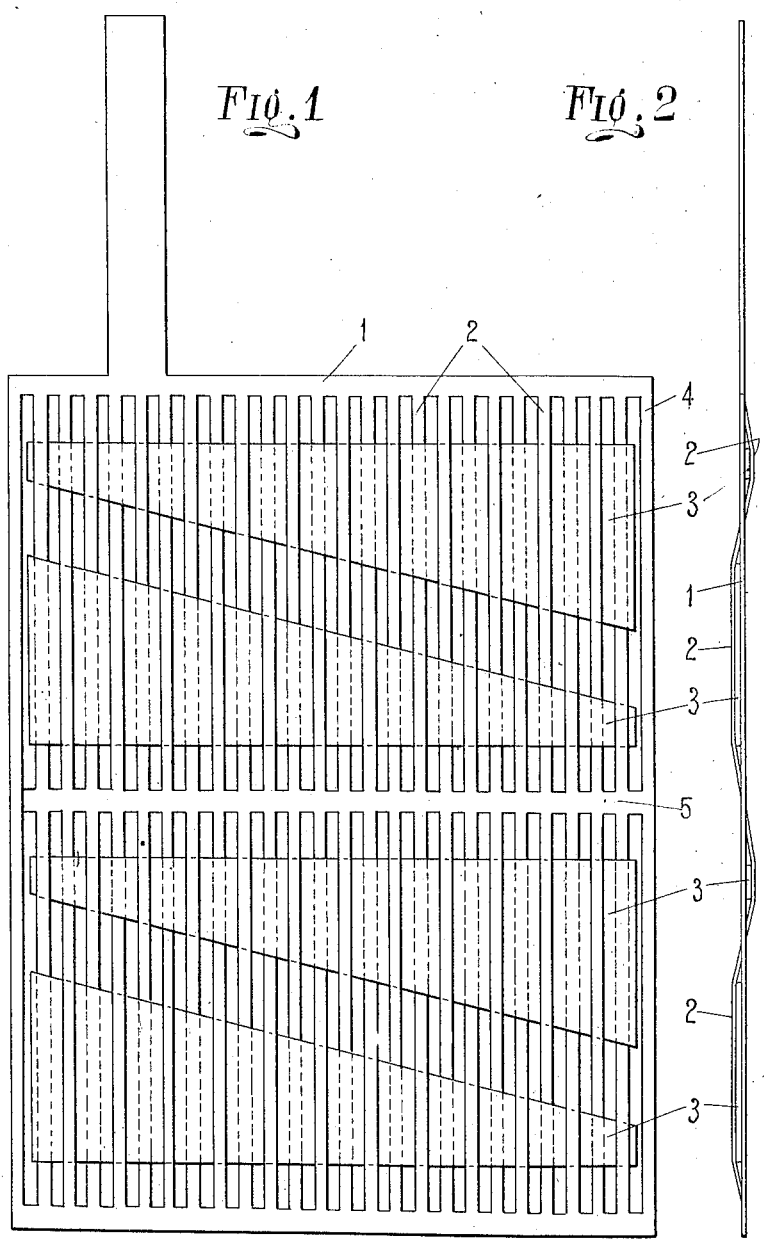

UNITED STATES PATENT OFFICE.

ADOLFO POUCHAIN, OF TURIN, ITALY.

NEGATIVE ELECTRODE FOR ELECTRIC ACCUMULATORS.

Application filed March 24, 1921. Serial No. 455,274.

*To all whom it may concern:*

Be it known that I, ADOLFO POUCHAIN, a subject of the King of Italy, and resident of Turin, Italy, have invented certain new and useful Improved Negative Electrodes for Electric Accumulators, of which the following is a specification.

This invention relates to negative electrodes for zinc electric accumulators and has for its object an electrode comprising a supporting plate, made of a metal which is a good conductor of electricity and whose surface is not attacked by the electrolyte, and pieces of zinc carried by said supporting plate.

An embodiment of this invention comprises a thin metal plate in which are made slots providing a grid, and blades of zinc engaged with said grid plate by being interlaced with the bars or bands of said grid.

The annexed drawing shows an embodiment of the electrode according to this invention; in said drawing Figure 1 is a front elevation and Figure 2 is a side elevation of the electrode.

The electrode comprises a plate 1 of a metal which is a good conductor and is not attacked by the electrolyte which is diluted sulphuric acid; for this purpose the plate 1 may be made of platinum, gold, silver, cadmium, etc. or may be of any other metal protected against action of the electrolyte by a proper coating of one of said metals.

The plate 1 is slotted as shown on the drawing to provide a grid consisting of a peripheral frame 4 and of intermediate bands 2. The plate may be provided with intermediate uncut portions as 5 for the purpose of imparting to it the required stiffness.

Blades 3 of zinc are then inserted between the bands 2 and are thus engaged with the plate 1 which provides a conducting support for the zinc.

During the discharge of an accumulator comprising electrodes made according to this invention the zinc carried by the plate is dissolved but the plate 1 is not attacked owing to the character of the material of which it is made; on the contrary during the charging period zinc is deposited both on the zinc blades 3 and on the parts of the plate 1, in consequence of the conductivity of the latter.

After a number of discharging and charging operations an electrode is obtained which is entirely coated with zinc with larger zinc deposits on the zones where the blades 3 were originally located; these deposits constitute a reserve intended to compensate for losses due to the amount of zinc falling on the bottom of the cell.

Thus the life of the plate is prolonged; further there is a uniform distribution of potential over the plate, on account of the intimate contact of the conducting bands 2 with the pieces of zinc 3, as well as a more uniform deposition of zinc than in usual plates, while the attack of the zinc when the circuit is open is diminished.

It is to be understood that the shape and size of the plate and of the slots and bands provided therein may be changed in several ways and that the described embodiment is given only by way of example the present invention being only defined by appended claims.

What I claim as my invention and desire to secure by United States Letters Patent is:—

1. A negative electrode for zinc electric accumulators, comprising a good conducting metal plate with a surface incapable of attack by the electrolyte in the accumulator in which the electrode is used, and zinc pieces carried by said plate, said zinc pieces being exposed over substantially their entire area to the electrolyte, whereby zinc is deposited on the said plate during charging of the accumulator, and dissolved therefrom during discharge of the accumulator.

2. A negative electrode for zinc electric accumulators comprising a good conducting metal plate with a surface incapable of attack by the electrolyte used in the accumulator, said plate being slotted to form parallel bands and extending substantially over the whole area of the electrode and a zinc reserve formed by zinc pieces each interlaced between said bands whereby the active zinc is deposited on the negative plate during the charge and dissolved therefrom during the discharge.

Signed at Turin, Italy, this 5th day of March A. D. 1921.

ADOLFO POUCHAIN.